United States Patent
Ikushima

(10) Patent No.: US 12,551,156 B2
(45) Date of Patent: Feb. 17, 2026

(54) FIBROSIS MEASUREMENT DEVICE, FIBROSIS MEASUREMENT METHOD AND PROPERTY MEASUREMENT DEVICE

(71) Applicant: JAPAN SCIENCE AND TECHNOLOGY AGENCY, Saitama (JP)

(72) Inventor: Kenji Ikushima, Tokyo (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 1030 days.

(21) Appl. No.: 17/638,580
(22) PCT Filed: Jul. 1, 2020
(86) PCT No.: PCT/JP2020/025888
§ 371 (c)(1),
(2) Date: Feb. 25, 2022
(87) PCT Pub. No.: WO2021/039104
PCT Pub. Date: Mar. 4, 2021

(65) Prior Publication Data
US 2022/0287618 A1    Sep. 15, 2022

(30) Foreign Application Priority Data
Aug. 26, 2019 (JP) ................ 2019-153856

(51) Int. Cl.
*A61B 5/38* (2021.01)
*A61B 5/05* (2021.01)
(Continued)

(52) U.S. Cl.
CPC ............. *A61B 5/38* (2021.01); *A61B 5/05* (2013.01); *G01N 24/08* (2013.01); *G01R 33/02* (2013.01); *A61B 8/08* (2013.01)

(58) Field of Classification Search
CPC .... A61B 5/38; A61B 5/05; A61B 8/08; A61B 5/0093; A61B 5/0097; A61B 8/4416;
(Continued)

(56) References Cited

U.S. PATENT DOCUMENTS

| 4,255,976 A | 3/1981 | Formato |
| 2009/0221900 A1* | 9/2009 | Ikushima ............. A61B 5/7203 600/409 |

(Continued)

FOREIGN PATENT DOCUMENTS

| JP | H04500896 A | 2/1992 |
| JP | 2006523093 | 10/2006 |

(Continued)

OTHER PUBLICATIONS

An Office Action in corresponding JP Application No. 2021-542585 dated May 21, 2024.

(Continued)

*Primary Examiner* — Iriana Cruz
(74) *Attorney, Agent, or Firm* — MUNCY, GEISSLER, OLDS & LOWE, P.C.

(57) ABSTRACT

A fibrosis measurement device that measures fibrosis of a biological tissue non-invasively includes: a sound wave emitter that performs scanning over a surface of a biological tissue as a measurement object to emit sound waves; an electromagnetic wave receiver that receives an electromagnetic wave generated at each location of a biological tissue irradiated with sound waves; a signal extractor that extracts a signal indicating physical property, based on at least one selected from a group including the amplitude, phase, and frequency of an electromagnetic wave received by the electromagnetic wave receiver; an imaging unit that images signals extracted by the signal extractor; and an area comparison unit that compares the area of a portion of the two-dimensional image in which signals indicating a property are displayed, with an area corresponding to a preset threshold of the strength of the signals.

7 Claims, 16 Drawing Sheets

(51) Int. Cl.
*G01N 24/08* (2006.01)
*G01R 33/02* (2006.01)
*A61B 8/08* (2006.01)

(58) Field of Classification Search
CPC ........ G01N 24/08; G01N 24/10; G01N 27/72; G01R 33/02; G01R 33/56358; G01R 33/60
See application file for complete search history.

(56) References Cited

U.S. PATENT DOCUMENTS

| | | | | |
|---|---|---|---|---|
| 2014/0150555 | A1* | 6/2014 | Ikushima | G01N 29/346 73/596 |
| 2014/0167752 | A1* | 6/2014 | Hanada | A61B 5/055 324/318 |
| 2020/0037916 | A1* | 2/2020 | Partanen | G01R 33/56358 |
| 2021/0038925 | A1* | 2/2021 | Emery | A61B 8/4209 |

FOREIGN PATENT DOCUMENTS

| | | |
|---|---|---|
| JP | 2017-523423 A | 8/2017 |
| WO | WO-2007/055057 A1 | 4/2009 |
| WO | WO-2012/165295 A | 2/2015 |

OTHER PUBLICATIONS

Ikushima, Kenji et al., "Electric polarization of soft biological tissues induced by ultrasound waves", Physical Review Letters, Dec. 3, 2019, p. 238101-1 to 238101-5, vol. 123, Iss. 23.

Ikushima, Kenji et al., "New approach turned to non-invasive measurement of body function: electricity and magnetism are measured by the supersonic", Materials Integration, Sep. 30, 2010, pp. 31-40, vol. 23, No. 9.

\* cited by examiner

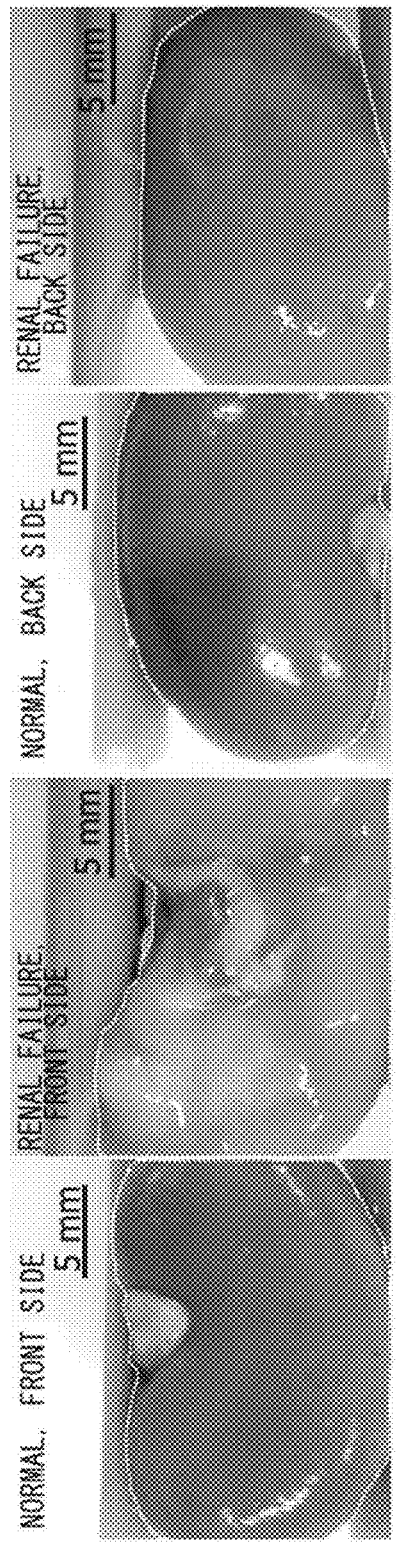

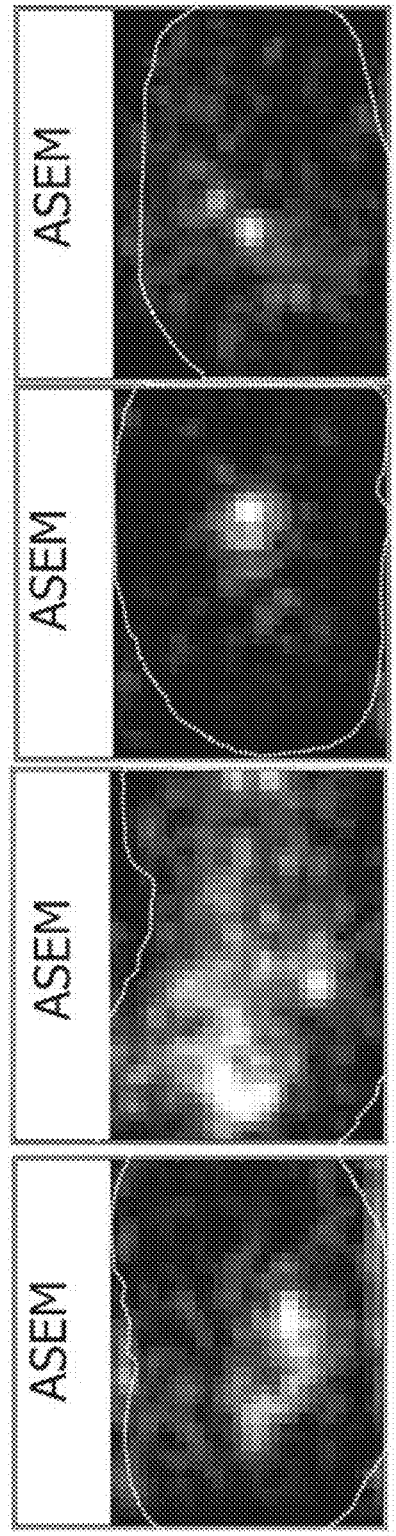

FIBROSIS MEASUREMENT DEVICE, FIBROSIS MEASUREMENT METHOD AND PROPERTY MEASUREMENT DEVICE

TECHNICAL FIELD

The present invention relates to a fibrosis measurement device for measuring fibrosis of a biological tissue, a fibrosis measurement method for measuring fibrosis of a biological tissue, and a property measurement device for measuring a property of a measurement object.

BACKGROUND ART

In the measurement technique "acoustically stimulated electromagnetic method" (hereinafter, also referred to as the "ASEM method") developed by the inventor, a measurement object is irradiated with sound waves such that the electric charge and magnetization of the measurement object is modulated, and information regarding electrical properties and magnetic properties of the measurement object is externally transmitted in the form of electromagnetic radiation (see Patent Literature 1, for example).

PRIOR ART REFERENCE

Patent Literature

Patent Literature 1: WO2007/055057

SUMMARY OF INVENTION

Technical Problem

In major organs other than the brain, such as the heart, kidneys, liver, and lungs, fibroblasts activated by inflammation or the like may produce a large amount of collagen, which may cause tissue fibrosis. Such collagen fibrosis is tissue degeneration universally observed in chronic diseases of organs and is hence an important indicator used by physicians to determine therapeutic intervention. For example, in the case of myocardial infarction, when myocardial cells become necrotic due to ischemia, collagen accumulates such as to fill in for the necrotic cells, causing heart fibrosis. Myocardial fibrosis is also one of diagnostic criteria for dilated cardiomyopathy and cardiac sarcoidosis, which have been designated as intractable diseases. Also in the kidneys and liver, in the case of chronic failure, tissues become fibrotic. For example, pulmonary fibrosis is a fatal disease in which collagen fibrosis occurs due to chronic inflammation of epithelial tissues that perform gas exchange, which may lead to dyspnea. Fibrosis is also known to occur in biological tissues including muscles, such as skeletal muscles, and skin.

The current mainstream test for such fibrosis is a biopsy, in which a tissue extracted from a patient is stained and observed under an optical microscope. However, biopsies place heavy burdens on patients and may be sometimes inapplicable to elderly people. Accordingly, there is a need for a non-invasive measurement technique with which tests for pathological assessment and prognosis prediction can be performed more frequently. Although many non-invasive measurement techniques, such as MRI, X-rays, elastography, and biomarker search, have been developed for each organ and disease, a method for directly measuring fibrosis has not yet been sufficiently established.

The present invention has been made in view of such an issue, and a purpose thereof is to measure fibrosis of biological tissues non-invasively.

Solution to Problem

In response to the above issue, a device according to one aspect of the present invention is a fibrosis measurement device that measures fibrosis of a biological tissue non-invasively. The device includes: a sound wave emitter that performs scanning over a surface of a biological tissue as a measurement object to emit sound waves such that the sound waves are concentrated on multiple locations of the biological tissue; an electromagnetic wave receiver that receives an electromagnetic wave generated at each location of a biological tissue irradiated with the sound waves; a signal extractor that extracts a signal indicating at least one property selected from a group including electrical properties, magnetic properties, electromechanical properties, and magnetomechanical properties of the biological tissue, based on at least one selected from a group including the amplitude, phase, and frequency of an electromagnetic wave received by the electromagnetic wave receiver; an imaging unit that images, as a two-dimensional image, signals extracted by the signal extractor; and an area comparison unit that compares the area of a portion of the two-dimensional image in which signals indicating a property are displayed, with an area corresponding to a predetermined threshold of the strength of the signals.

The fibrosis measurement device that measures fibrosis of a biological tissue non-invasively may further include an echo receiver that receives an echo signal from each location of the biological tissue. In this case, the signal extractor may extract a property received in half the time from when the sound wave emitter has emitted a sound wave until the echo receiver has received an echo signal, in which the property is associated with the echo signal.

A delay material may be provided between the sound wave emitter and the biological tissue.

The biological tissue may include at least one of an organ, a muscle, or skin.

The biological tissue may be a kidney.

When the area of a portion in which signals indicating a property are displayed is calculated, weighting may be performed based on the strength of the signals.

Another aspect of the present invention also relates to a device. The device is a fibrosis measurement device that measures fibrosis of a biological tissue non-invasively and includes: a sound wave emitter that emits sound waves such that the sound waves are concentrated on a biological tissue as a measurement object; an electromagnetic wave receiver that receives an electromagnetic wave generated in a biological tissue irradiated with the sound waves; a signal extractor that extracts a signal indicating at least one property selected from a group including electrical properties, magnetic properties, electromechanical properties, and magnetomechanical properties of the biological tissue, based on at least one selected from a group including the amplitude, phase, and frequency of an electromagnetic wave received by the electromagnetic wave receiver; and a signal strength comparison unit that compares the strength of a signal extracted by the signal extractor with a predetermined threshold.

The fibrosis measurement device that measures fibrosis of a biological tissue non-invasively may further include an echo receiver that receives an echo signal from the biological tissue. The signal extractor may extract a signal indicating a property received in half the time from when the sound wave emitter has emitted a sound wave until the echo receiver has received an echo signal, in which the signal is associated with the echo signal.

The sound wave emitter may have substantially the same curvature as a body surface covering a biological tissue as a measurement object.

Yet another aspect of the present invention relates to a method. The method is a fibrosis measurement method for measuring fibrosis of a biological tissue non-invasively and includes: performing scanning over a surface of a biological tissue as a measurement object to emit sound waves such that the sound waves are concentrated on multiple locations of the biological tissue; receiving an electromagnetic wave generated at each location of a biological tissue irradiated with the sound waves; extracting a signal indicating at least one property selected from a group including electrical properties, magnetic properties, electromechanical properties, and magnetomechanical properties of the biological tissue, based on at least one selected from a group including the amplitude, phase, and frequency of a received electromagnetic wave; imaging extracted signals as a two-dimensional image; and comparing the area of a portion of the two-dimensional image in which signals indicating a property are displayed, with an area corresponding to a predetermined threshold of the strength of the signals.

Still yet another aspect of the present invention also relates to a method. The method is a fibrosis measurement method for measuring fibrosis of a biological tissue non-invasively and includes: performing scanning over a surface of a biological tissue as a measurement object to emit sound waves such that the sound waves are concentrated on multiple locations of the biological tissue; receiving an echo signal from each location of a biological tissue irradiated with the sound waves and receiving an electromagnetic wave generated at each location of a biological tissue irradiated with the sound waves; extracting a signal indicating at least one property selected from a group including electrical properties, magnetic properties, electromechanical properties, and magnetomechanical properties of the biological tissue, based on at least one selected from a group including the amplitude, phase, and frequency of a received electromagnetic wave, in which the signal is associated with an echo signal; imaging extracted signals as a two-dimensional image; and comparing the area of a portion of the two-dimensional image in which signals indicating a property are displayed, with an area corresponding to a predetermined threshold of the strength of the signals.

Still yet another aspect of the present invention also relates to a method. The method is a fibrosis measurement method for measuring fibrosis of a biological tissue non-invasively and includes: emitting sound waves such that the sound waves are concentrated on a biological tissue as a measurement object; receiving an electromagnetic wave generated in a biological tissue irradiated with the sound waves; extracting a signal indicating at least one property selected from a group including electrical properties, magnetic properties, electromechanical properties, and magnetomechanical properties of the biological tissue, based on at least one selected from a group including the amplitude, phase, and frequency of a received electromagnetic wave; and comparing the strength of an extracted signal with a predetermined threshold.

Still yet another aspect of the present invention also relates to a method. The method is a fibrosis measurement method for measuring fibrosis of a biological tissue non-invasively and includes: emitting sound waves such that the sound waves are concentrated on a biological tissue as a measurement object; receiving an echo signal from a biological tissue irradiated with the sound waves and receiving an electromagnetic wave generated in a biological tissue irradiated with the sound waves; extracting a signal indicating at least one property selected from a group including electrical properties, magnetic properties, electromechanical properties, and magnetomechanical properties of the biological tissue, based on at least one selected from a group including the amplitude, phase, and frequency of a received electromagnetic wave, in which the signal is associated with an echo signal; and comparing the strength of an extracted signal with a predetermined threshold.

A further aspect of the present invention relates to a device. The device is a property measurement device that measures a property of a measurement object and includes: a sound wave emitter that emits sound waves such that the sound waves are concentrated on the measurement object; an electromagnetic wave receiver that receives an electromagnetic wave generated in a measurement object irradiated with the sound waves; and a signal extractor that extracts a signal indicating at least one property selected from a group including electrical properties, magnetic properties, electromechanical properties, and magnetomechanical properties of the measurement object, based on at least one selected from a group including the amplitude, phase, and frequency of an electromagnetic wave received by the electromagnetic wave receiver. The electromagnetic wave receiver includes a resonant circuit including a coil and a capacitor, and an electrostatic antenna disposed between the coil and the capacitor.

Optional combinations of the aforementioned constituting elements, and implementation of the present invention in the form of apparatuses, methods, systems, recording media, and computer programs may also be practiced as additional modes of the present invention.

Advantageous Effects of Invention

The present invention enables non-invasive measurement of fibrosis of biological tissues.

BRIEF DESCRIPTION OF DRAWINGS

FIGS. 4A and 4B are graphs that show time variations of signals received by an electromagnetic wave receiver and an echo receiver, in which FIG. 4A is a graph showing a time variation of signals received by the electromagnetic wave receiver, and FIG. 4B is a graph showing a time variation of signals received by the echo receiver;

FIGS. 15A-15D are pictures of a normal rat kidney and a rat kidney in which fibrosis has occurred due to renal failure, in which FIG. 15A shows a front side of the normal kidney, FIG. 15B shows a front side of the kidney with renal failure, FIG. 15C shows a back side of the normal kidney, and FIG. 15D shows a back side of the kidney with renal failure; and FIGS. 16A-16D are pictures obtained by imaging signals by means of the fibrosis measurement device shown in FIG. 3, using the kidneys shown in FIGS. 16A-16D, in which FIG. 16A shows the front side of the normal kidney, FIG. 16B shows the front side of the kidney with renal failure, FIG. 16C shows the back side of the normal kidney, and FIG. 16D shows the back side of the kidney with renal failure.

DESCRIPTION OF EMBODIMENTS

Figure 1:
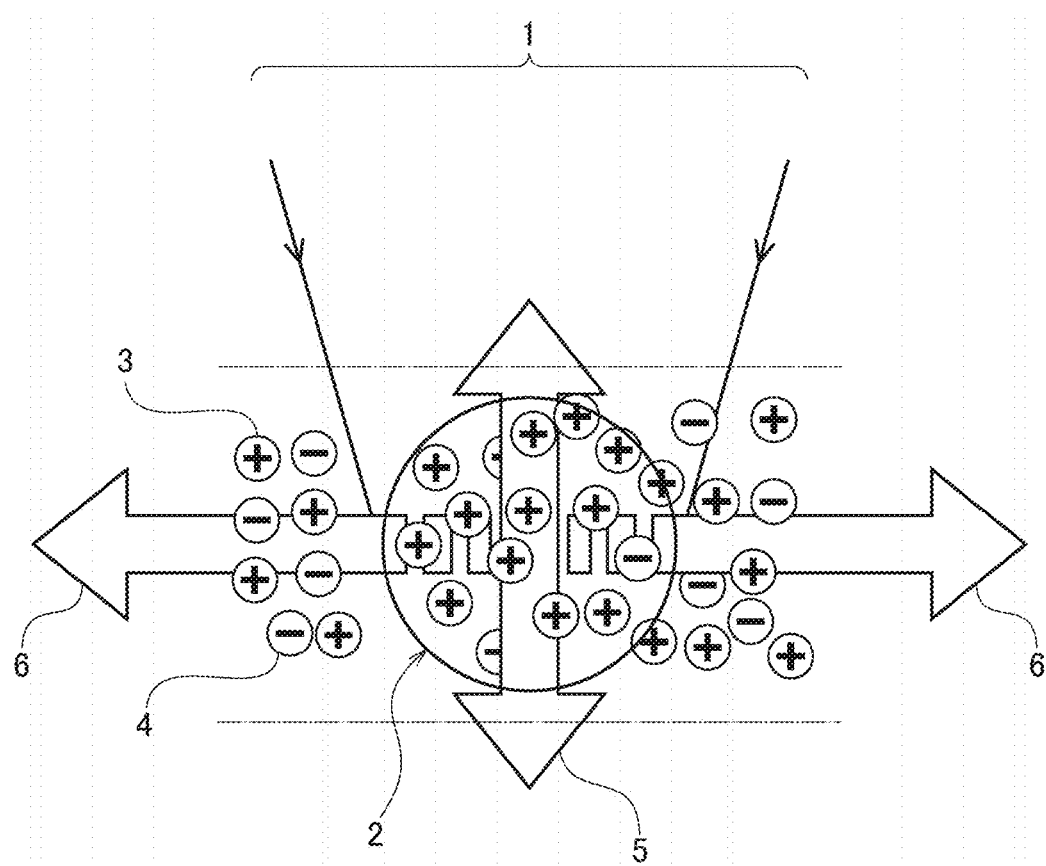
FIG. 1 is a schematic diagram that illustrates a state of electric and magnetic fields induced by irradiating a measurement object with sound waves.

In the following, the present invention will be described based on preferred embodiments with reference to each drawing. In the embodiments and modifications, same reference characters denote same or corresponding constituting elements, steps, and members, and the repetitive description will be omitted as appropriate. Also, the dimensions of a member may be appropriately enlarged or reduced in each drawing in order to facilitate understanding. Further, in each drawing, part of members less important in describing embodiments may be omitted. Also, terms including ordinal numbers, such as "first" and "second", are used to describe various constituting elements; however, such terms are used in order to distinguish one constituting element from another and do not limit the constituting elements.

Acoustically Stimulated Electromagnetic Method (ASEM Method)

Before specific description of the embodiments is given, an overview of the acoustically stimulated electromagnetic method (ASEM method) will be described as basic knowledge. Ultrasonic measurement has been widely used for non-destructive testing on human bodies and structures. One of its significant advantages is that ultrasound has high internal penetrability through objects, such as living bodies, metals, and concrete blocks, through which light can scarcely penetrate. Furthermore, due to a major difference between the speed of sound and the speed of light, the wavelength of a sound wave is about five orders of magnitude shorter than that of an electromagnetic wave at the same frequency. This means that focus (i.e., spatial resolution) on the order of millimeters and micrometers can be achieved in MHz and GHz frequency bands, in which real-time waveforms can be easily acquired. However, despite such advantages, the use of ultrasound is mostly limited to examination of mass density distributions and elastic properties of objects. In other words, conventional ultrasonic measurement detects "scratches and foreign matters" but does not probe "electricity and magnetism".

Sound waves as elastic waves do not have direct connection with electrical or magnetic properties as electromagnetic waves do. However, elastic modulation can often provide temporal modulation to the electric charge or magnetic moment of an object, through lattice distortion of a solid or density change of a liquid. This means that, with ultrasound irradiation, electromagnetic waves (usually RF waves to microwaves) having the same frequency as ultrasound may occur due to dipole radiation. Such electromagnetic waves excited by ultrasound or other sound waves will be referred to as "acoustically stimulated electromagnetic waves" (or "ASEM waves").

By irradiating an object with a focused sound beam, temporal or spatial modulation can be provided to local ion concentration of the object and the electric flux density gradient of the medium associated therewith, thereby inducing electromagnetic radiation. The acoustically stimulated electromagnetic method is a measurement method that utilizes this principle. More specifically, in the acoustically stimulated electromagnetic method, a measurement object is irradiated with sound waves such that the electric charge and magnetization of the measurement object is modulated, and information regarding electrical properties and magnetic properties of the measurement object is externally transmitted in the form of acoustically stimulated electromagnetic waves. As described previously, sound waves can achieve a spatial resolution five orders of magnitude higher than electromagnetic waves at the same frequency. For example, while the wavelength of a 10 MHz radio wave is 30 m, the wavelength of an underwater sound wave is 150 μm. Therefore, by performing scanning with a focused sound beam, an object can be imaged with high resolution.

FIG. 1 schematically illustrates a state of electric and magnetic fields induced by irradiating a measurement object with sound waves. FIG. 1 shows a state where a focused sound beam 1 is focused on a portion 2 of the measurement object. The circled + and − symbols respectively indicate positively charged particles 3 and negatively charged particles 4. In the sound focused region 2, the concentration balance between the positively charged particles 3 and the negatively charged particles 4 is disrupted; accordingly, a charge distribution state in which the number of positively charged particles 3 is larger than the number of negatively charged particles 4 is shown. Meanwhile, in a region outside the sound focused region 2, the concentration is balanced between the positively charged particles 3 and the negatively charged particles 4. An arrow 5 indicates vibration directions of sound waves in the focused sound beam 1, which correspond to directions of the electric field.

As illustrated in FIG. 1, with the irradiation of the focused sound beam 1, the positively charged particles 3 and the negatively charged particles 4 vibrate in the vibration directions of the sound waves (the arrow 5) at the same frequency as the sound waves. At the time, the vibration of the positively charged particles 3 and the negatively charged particles 4 induces an electric field parallel to the vibration directions 5 and also induces a magnetic field to occur in a plane perpendicular to the vibration directions 5 (an arrow 6). Since the electric fields or the magnetic fields generated by the same vibration of the positively charged particles 3 and the negatively charged particles 4 have phases shifted from each other by n, the electric fields or the magnetic fields cancel each other out. Accordingly, in a region outside the sound focused region 2, a net electric field or magnetic field is not induced. Meanwhile, in the sound focused region 2, since the charge distribution state therein shows that the positively charged particles 3 are larger in number than the negatively charged particles 4, the electric fields or the magnetic fields do not completely cancel each other out, so that a net electric field or magnetic field is induced. Therefore, when such an electric field or a magnetic field induced by sound waves is measured and a change in the strength of the electric field or magnetic field is observed, it shows that there has been a change in the charge distribution, i.e., a change in either the concentration of the positively charged particles 3 or the concentration of the negatively charged particles 4 or both. Thus, based on the measurement of an electric field or a magnetic field induced by sound waves, a change in a characteristic value, the concentration in this case, of charged particles in the measurement object can be measured.

Hereinafter, an electric field and a magnetic field will be collectively referred to as an electromagnetic field. FIG. 1 shows an example in which a change in the concentration of charged particles is measured based on the measurement of an electromagnetic field induced by sound waves. However, a measurable change in a characteristic value of charged particles is not limited to a change in the concentration and may also be a change in the mass, size, shape, number of charges, or interaction force with the medium surrounding the charged particles. For example, if it is found, from other knowledge regarding the state of the measurement object or the like, that a change of the concentration, mass, size, shape, and number of charges is impossible, a measured change in the strength of the electromagnetic field can be linked to a change in the interaction force with the medium surrounding the charged particles. Accordingly, a measured change in the strength of the electromagnetic field can be linked to a change in the electronic polarizability or cation polarizability, for example.

Particularly, when a measurement object is irradiated with sound waves and when electromagnetic waves generated in the measurement object are received, based on at least one selected from a group including the amplitude, phase, and frequency of a received electromagnetic wave, a signal indicating at least one property selected from a group including the electrical properties, magnetic properties, electromechanical properties, and magnetomechanical properties of the measurement object can be extracted. At the time, as an electrical property of the measurement object, a change in at least one characteristic value selected from a group including the electric field, the dielectric constant, the spatial gradient of the electric field or the dielectric constant, the concentration, mass, dimensions, shape, and number of charges of the charged particles included in the measurement object, and the interaction with the medium surrounding the charged particles may be measured. Also, as a magnetic property of the measurement object, magnetization or acoustic magnetic resonance caused by the electron spins or nuclear spins of the measurement object may be measured. Further, as an electromechanical property and a magnetomechanical property of the measurement object, a piezoelectric property or a magnetostrictive property of the measurement object may be measured. Thus, with the acoustically stimulated electromagnetic method, an electrical property, a magnetic property, an electromechanical property, and a magnetomechanical property of a measurement object inside a body can be non-destructively measured with high resolution.

A portion of a biological tissue in which fibrosis has occurred or progressed has an electrical property, a magnetic property, an electromechanical property, or a magnetomechanical property different from that of a portion with no fibrosis. Therefore, it is considered that, by using the acoustically stimulated electromagnetic method, fibrosis of biological tissues can be measured non-invasively.

First Embodiment

Figure 2:
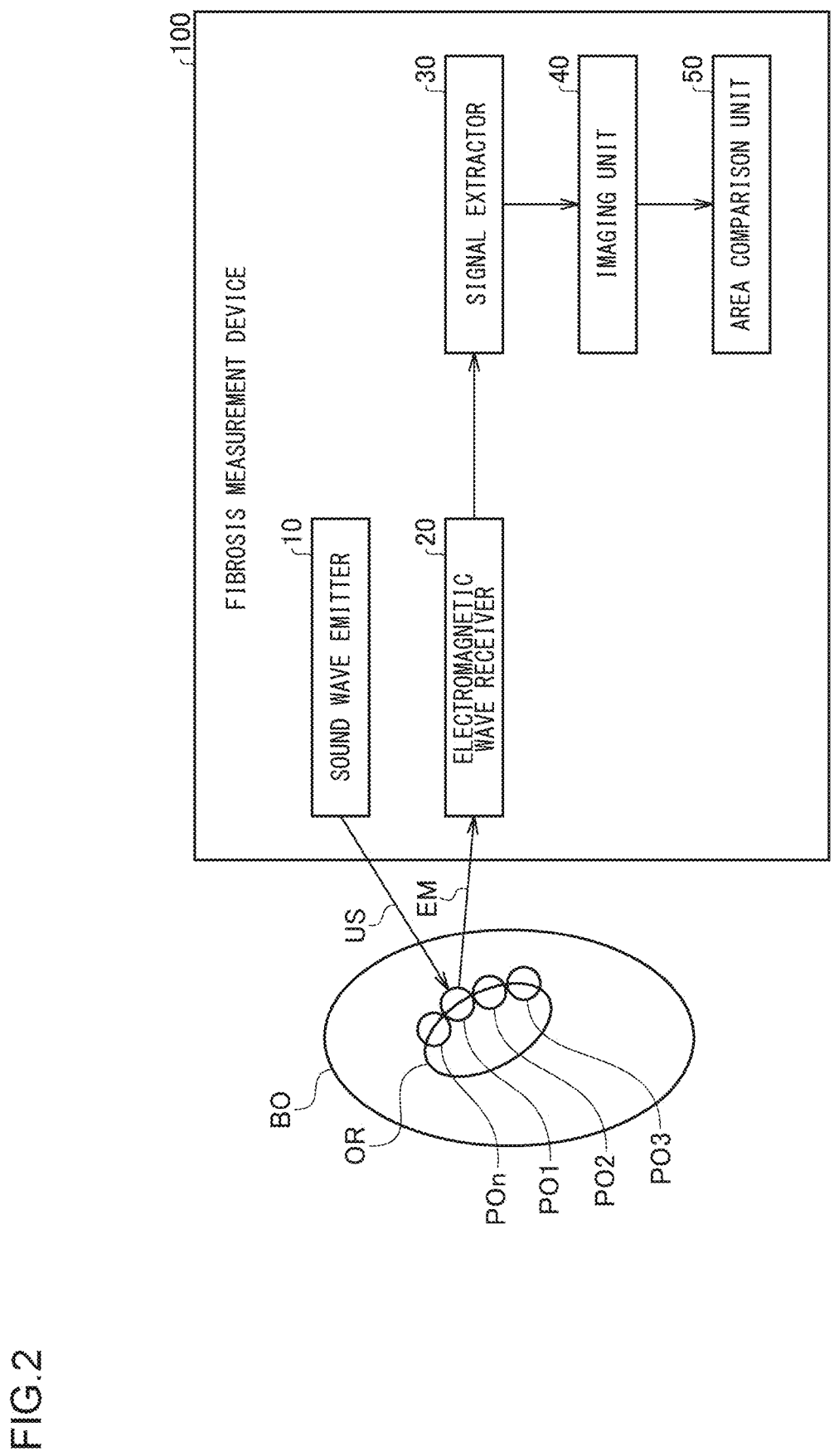
FIG. 2 is a functional block diagram of a fibrosis measurement device according to a first embodiment.

FIG. 2 shows functional blocks of a fibrosis measurement device 100 according to the first embodiment. The fibrosis measurement device 100 measures fibrosis of a biological tissue non-invasively. The fibrosis measurement device 100 includes a sound wave emitter 10, an electromagnetic wave receiver 20, a signal extractor 30, an imaging unit 40, and an area comparison unit 50.

The sound wave emitter 10 generates sound waves US, such as ultrasonic waves, and performs scanning over the surface of a biological tissue OR as a measurement object to emit the sound waves US such that the sound waves US are concentrated on multiple locations of the biological tissue OR. To concentrate the sound waves US on a location of the biological tissue OR inside a body BD of a person or an animal, multiple piezoelectric elements may be arranged on a concave curved surface having a shape with which normal lines passing through a location PO1 of the biological tissue OR are focused on a single focal point, for example; accordingly, the sound waves US may be generated simultaneously by the multiple piezoelectric elements, and each sound wave US may be emitted such that the focal point defined by the concave curved surface coincides with PO1 (sound lens method). By using such a sound lens to perform mechanical scanning around the biological tissue OR, the sound waves US can be focused on multiple locations PO1, PO2, PO3, . . . , POn of the biological tissue OR. By setting PO1, PO2, PO3, . . . , POn so that the PO1, PO2, PO3, . . . , POn fill the biological tissue OR, the entire surface of the biological tissue OR can be irradiated with the sound waves US.

The electromagnetic wave receiver 20 is constituted by an antenna, a resonant circuit, and the like and receives electromagnetic waves EM generated at the respective locations of the biological tissue OR irradiated with the sound waves US. The electromagnetic wave receiver may be configured to move in conjunction with the scanning by the sound wave emitter 10 such as to efficiently receive the electromagnetic waves EM or may be configured to be fixed at one position to receive the electromagnetic waves EM emitted from arbitrary directions.

The signal extractor 30 extracts a signal indicating at least one property selected from a group including the electrical properties, magnetic properties, electromechanical properties, and magnetomechanical properties of the biological tissue OR, based on at least one selected from a group including the amplitude, phase, and frequency of an electromagnetic wave EM received by the electromagnetic wave receiver 20.

For example, a signal indicating magnetization caused by the electron spins or nuclear spins as a magnetic property of the biological tissue OR may be extracted as follows. As in the case of electric polarization, an electromagnetic field is generated also by a time variation of magnetization. According to the Maxwell's equations, a radiated electric field is proportional to a second derivative of magnetization with respect to time. Therefore, based on the strength or phase of the electromagnetic field, a signal indicating the magnitude or direction of the magnetization can be extracted.

Also, a signal indicating acoustic magnetic resonance caused by the electron spins or nuclear spins as a magnetic property of the biological tissue OR may be extracted as follows, for example. Since sound waves are efficiently absorbed at a certain resonant frequency, which changes the directions of the electron spins or nuclear spins, the strength and the phase of the electromagnetic field can be expected to change significantly at the frequency. As information, the resonant frequency can be determined. In addition, as in the case of general ESR (electron spin resonance) and NMR (nuclear magnetic resonance), a spectrum can be obtained by scanning the frequency of the sound waves, and signals indicating the electron spins or nuclear spins can be extracted. Further, a signal indicating electron-spin relaxation time or nuclear-spin relaxation time can also be extracted.

Also, a signal indicating a piezoelectric property or a magnetostrictive property as an electromechanical property or a magnetomechanical property of the biological tissue OR may be extracted as follows, for example. In ionic crystals without inversion symmetry, electric polarization is caused by strain in principle. Accordingly, a signal indicating the magnitude of the polarization can be extracted based on the strength of the electromagnetic field to be measured, which can be regarded as an acoustically stimulated electromagnetic wave. By performing scanning with sound waves, a piezoelectric property of the biological tissue RO can be imaged. Further, based on the direction of sound wave propagation and the angular distribution of the generated electromagnetic field, a signal indicating the piezoelectric tensor can be extracted in a contactless manner without any electrode provided on the biological tissue OR.

Also, a signal indicating a magnetostrictive property as an electromechanical property or a magnetomechanical property of the biological tissue OR may be measured as follows, for example. Magnetostriction is a phenomenon in which electron orbitals change due to crystal strain, and a change is added to the electron spin magnetization through spin-orbit interaction. In another mode, the magnetic domain structure may change due to external strain, which may result in a change in the effective magnetization in a macroscopic region (such as a sound beam spot). Further, crystal strain may also cause a change in the crystal field splitting, which may change the electronic state and also change the magnitude of the electron spin magnetization. It is considered that such temporal changes generate an electromagnetic field. Therefore, based on the amplitude of the acoustically stimulated electromagnetic wave, the magnitude of the magnetization, spin-orbit interaction, sensitivity of the crystal strain and the electron orbital change, sensitivity of the crystal field splitting and the strain, a relationship between the crystal field splitting and the electron spin state, or a relationship between the magnetic domain structure and the strain can be determined. Also, based on the direction of sound wave propagation and the radiation strength, a signal indicating the magnetostriction tensor can be extracted in a contactless manner without any electrode provided on the biological tissue OR. As with a piezoelectric property, a magnetostrictive property can also be imaged.

It is considered that each signal thus extracted contains information regarding the presence and progress of fibrosis at each location of the biological tissue OR, for example. In other words, by obtaining such signals, fibrosis of the biological tissue OR can be measured non-invasively.

The imaging unit 40 images, as a two-dimensional image, signals extracted by the signal extractor 30. The imaging may be performed by, for example, providing one or more pixels to each of regions corresponding to the respective locations PO1, PO2, PO3, . . . , POn of the biological tissue OR and generating a two-dimensional digital image based on the presence and strength of signals extracted by the signal extractor 30. Accordingly, the presence and progress of fibrosis at each location of the biological tissue OR can be imaged and visualized.

The area comparison unit 50 compares the area of a portion of the two-dimensional image generated by the imaging unit 40 in which signals indicating a property as described above are displayed, with an area corresponding to a predetermined threshold of the strength of the signals. As described previously, it is considered that a portion in which signals are displayed corresponds to a portion in which fibrosis has occurred. However, a signal (noise) unrelated to fibrosis may be generated due to various electrical properties or magnetic properties of normal biological tissues or due to an excitation pulse from the sound wave emitter 10, for example. In this case, the presence and progress of fibrosis cannot be accurately ascertained merely by viewing the two-dimensional image generated by the imaging unit 40. Accordingly, a threshold related to signal strength (such as a voltage value) may be determined in advance based on experiments and simulations, and a signal of which the strength exceeds the threshold may be considered as a fibrosis-related signal. Since the area of a portion in which signals are displayed can be considered as the integral value of signals emitted from various locations of the biological tissue, the value of area corresponding to the aforementioned threshold of signal strength may be predetermined. By comparing, with the value of area thus predetermined, the area of a portion of the two-dimensional image generated by the imaging unit 40 in which signals indicating a property are displayed, signals actually caused by fibrosis can be extracted from noise. For example, when the area of a portion of the two-dimensional image generated by the imaging unit 40 in which signals indicating a property are displayed exceeds the predetermined value of area, it may be determined that fibrosis has occurred. Alternatively, by defining, as an amount indicating the degree of fibrosis, the area of a portion in which signals are displayed that exceeds the threshold, fibrosis can be quantitatively evaluated.

For example, for clinical application, it is possible to statistically determine, through clinical trials for each disease, the percentage of the area of a portion in which signals indicating a property are displayed that exceeds the aforementioned predetermined value of area with respect to the area of the entire biological tissue, above which it is judged that the disease has been developed.

According to the present embodiment, fibrosis of a biological tissue can be measured non-invasively.

Second Embodiment

Figure 3:
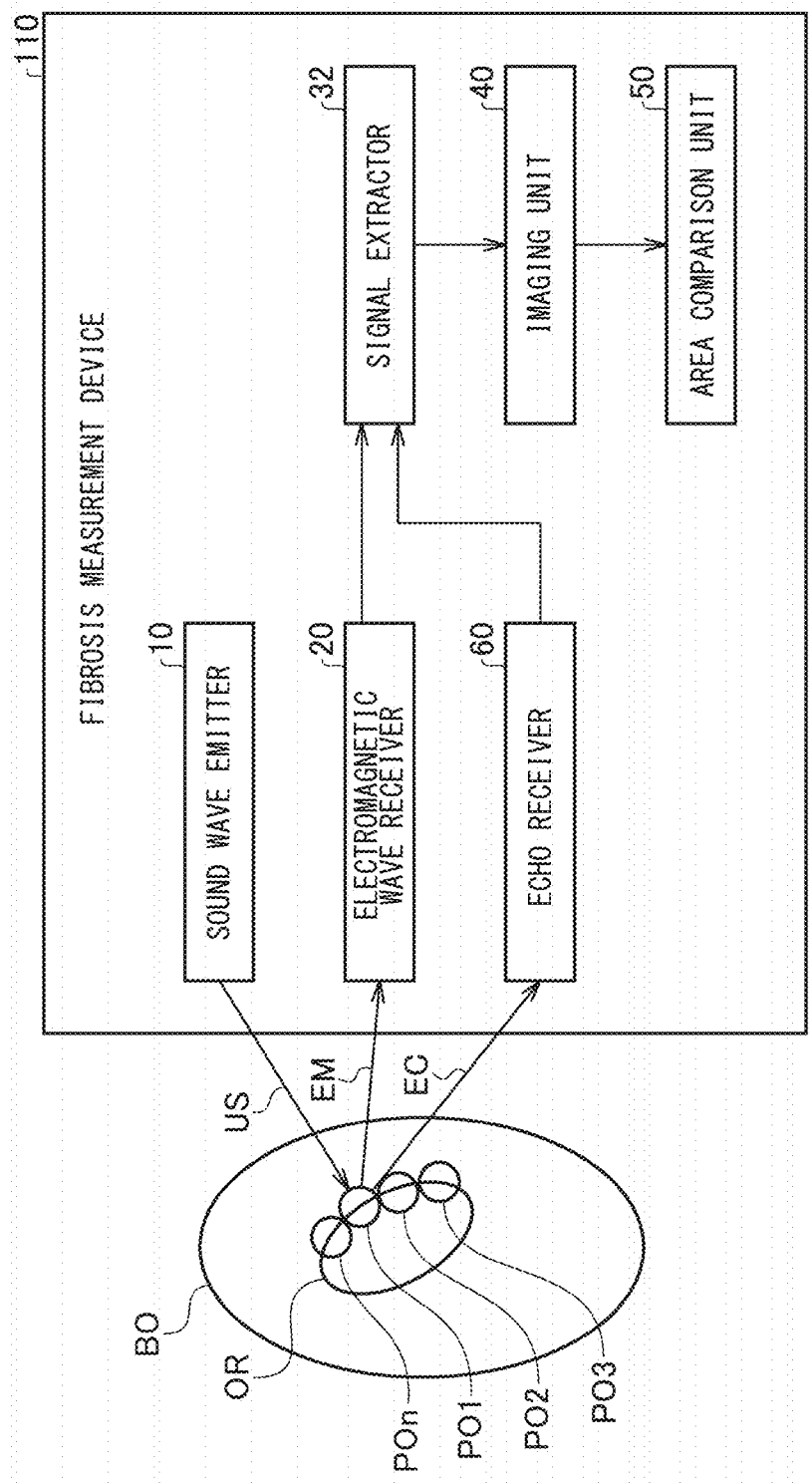
FIG. 3 is a functional block diagram of a fibrosis measurement device according to a second embodiment.

FIG. 3 shows functional blocks of a fibrosis measurement device 110 according to the second embodiment. The fibrosis measurement device 110 also measures fibrosis of a biological tissue non-invasively. The fibrosis measurement device 110 includes the sound wave emitter 10, the electromagnetic wave receiver 20, a signal extractor 32, the imaging unit 40, the area comparison unit 50, and an echo receiver 60.

Since the configurations of the sound wave emitter 10, the electromagnetic wave receiver 20, the imaging unit 40, and the area comparison unit 50 are identical with those of the fibrosis measurement device 100, the explanation thereof will be omitted. The echo receiver 60 receives echo signals EC from the respective locations of the biological tissue OR. The echo signals EC are sound echoes of the sound waves US emitted by the sound wave emitter 10 to the respective locations of the biological tissue OR. The echo receiver 60 may be configured to move in conjunction with the scanning by the sound wave emitter 10 such as to efficiently receive the echo signals EC or may be configured to be fixed at one position to receive the echo signals EC emitted from arbitrary directions.

The signal extractor 32 extracts a signal indicating a property received in half the time from when the sound wave emitter 10 has emitted a sound wave US until the echo receiver 60 has received an echo signal EC, in which the signal is associated with the echo signal EC.

Figure 4:
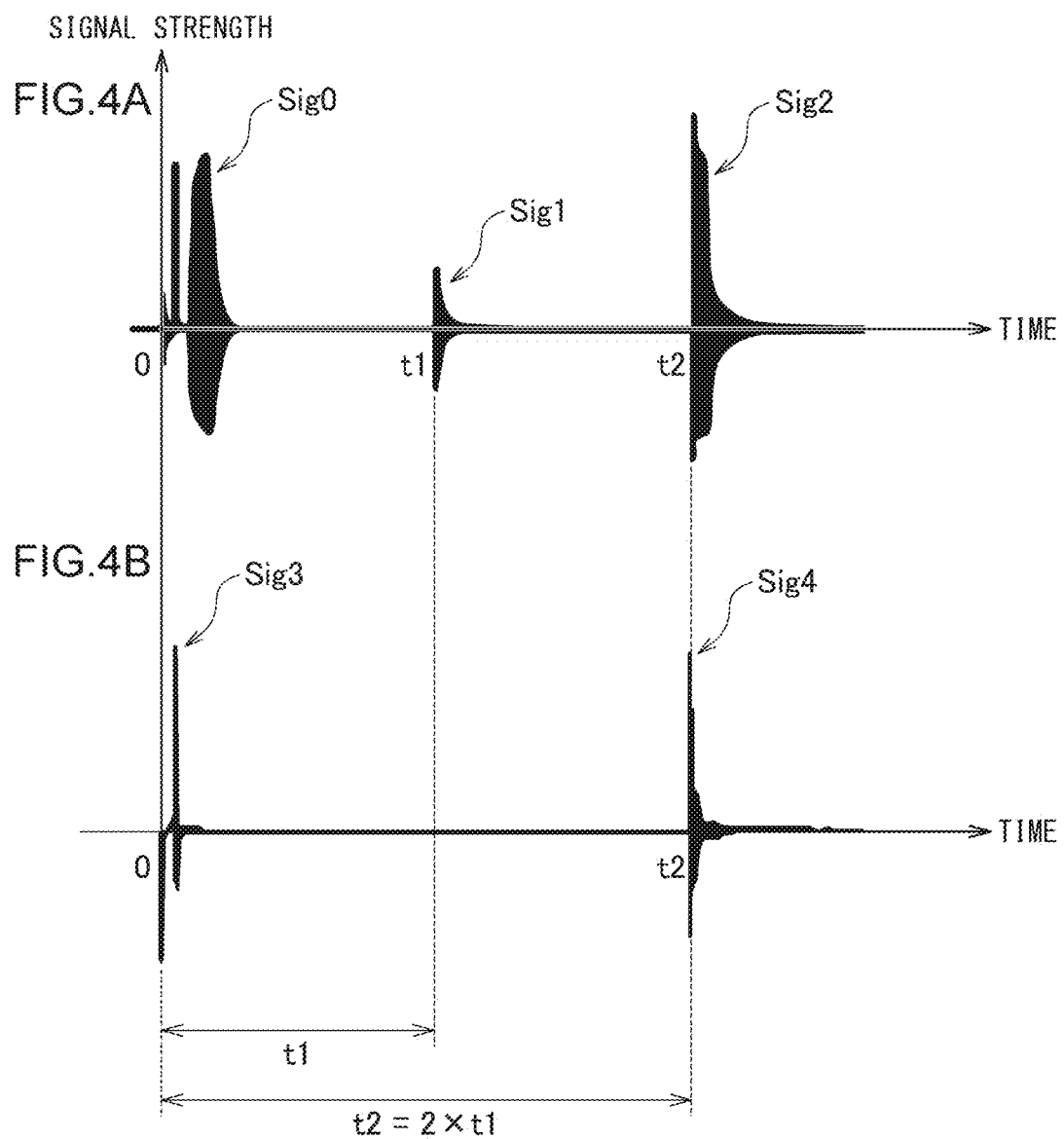

FIGS. 4A and 4B show time variations of signals received by the electromagnetic wave receiver 20 and the echo receiver 60. FIG. 4A shows signals received by the electromagnetic wave receiver 20, and FIG. 4B shows signals received by the echo receiver 60. At time t=0, the sound wave emitter 10 emits sound waves. The electromagnetic wave receiver 20 observes a signal Sig0 at time t=0, observes a signal Sig1 at time t=t1, and observes a signal Sig2 at time t=t2. The echo receiver 60 observes a signal Sig3 at time t=0 and observes a signal Sig4 at time t=t2. It is considered that the signal Sig1 at time t=t1 indicates an acoustically stimulated electromagnetic wave generated at a location irradiated with the sound waves. However, it is generally known that signals received by the electromagnetic wave receiver 20 include various noise mixed therein and hence have a spread in the time axis direction. Accordingly, if there is a significant amount of noise, it may be difficult to identify a signal indicating an acoustically stimulated electromagnetic wave from among the received signals. Meanwhile, the signals Sig3 and Sig4 received by the echo receiver 60 have remarkably sharp characteristics in the time axis direction. As shown in FIGS. 4A and 4B, t2=2×t1. Accordingly, it is found that the signal Sig1 is received at the time t1, which is half of the time t2 when the echo receiver 60 receives the signal Sig4, starting from the time when the sound wave emitter 10 has emitted the sound waves. In other words, it is considered that, among the signals received by the electromagnetic wave receiver 20, a signal indicating an acoustically stimulated electromagnetic wave generated at a location irradiated with the sound waves is received in half the arrival time of an echo signal. By using this fact, a signal indicating an acoustically stimulated electromagnetic wave can be identified from among signals received by the electromagnetic wave receiver 20. More specifically, by extracting a signal indicating a property received in half the time from when the sound wave emitter 10 has emitted a sound wave until the echo receiver 60 has received an echo signal, in which the signal is associated with the echo signal, a targeted signal can be extracted from noise. This enables more accurate measurement of fibrosis.

According to the present embodiment, fibrosis of a biological tissue can be measured more accurately.

Figure 5:
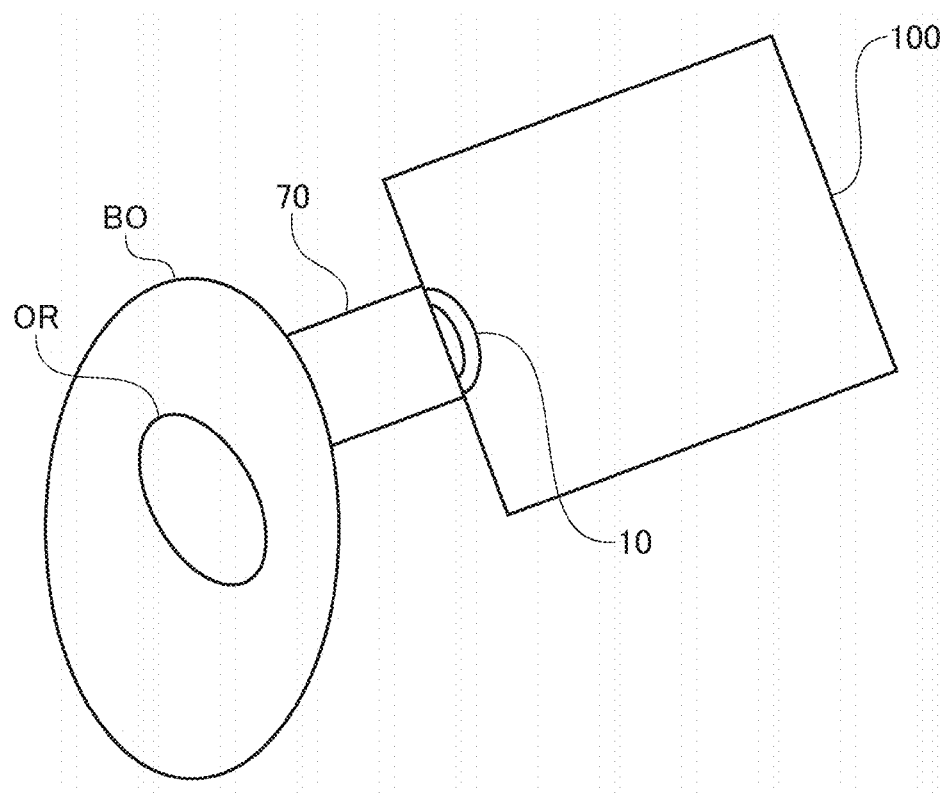
FIG. 5 is a schematic diagram of a fibrosis measurement device provided with a delay material.

The fibrosis measurement device 100 according to the first embodiment or the fibrosis measurement device 110 according to the second embodiment may include a delay material 70 provided between the sound wave emitter 10 and the biological tissue OR. FIG. 5 schematically illustrates the fibrosis measurement device 100 provided with the delay material 70. The delay material 70 is configured with water and synthetic resin to delay the time at which a signal is transmitted between the sound wave emitter 10 and the biological tissue OR. If the distance between the sound wave emitter 10 and the biological tissue OR is too short, noise caused by the excitation pulses from the sound wave emitter 10 and noise generated at various locations of the biological tissue OR may overlap a targeted signal. In this case, the targeted signal is buried in the noise, so that accurate measurement cannot be performed. With the delay material 70 provided between the sound wave emitter 10 and the biological tissue OR, however, an appropriate time difference can be provided between the noise and the targeted signal, so that the targeted signal can be extracted from the noise.

The size (particularly the distance between the sound wave emitter 10 and the biological tissue OR), material, shape, and the like of the delay material 70 may be appropriately determined based on the type of the targeted biological tissue, the body shape and the amount of subcutaneous fat of the subject, the amplitude of the sound waves emitted by the sound wave emitter, and the sensitivity of the electromagnetic wave receiver, for example. It is particularly known that fibrosis often occurs on a surface of a biological tissue. Therefore, the size, material, shape, and the like of the delay material 70 may be determined so that noise from the front surface or back surface of the biological tissue to the sound wave emitter can be best reduced.

According to the present embodiment, fibrosis of a biological tissue can be measured further accurately.

The biological tissue OR may include any organ, muscle, or skin. Fibrosis is known to occur in biological tissues such as organs (kidneys, for example), muscles (skeletal muscles, for example), and skin. Accordingly, with the present embodiment applied to such biological tissues, fibrosis of the biological tissues can be measured non-invasively.

Particularly, the biological tissue OR may be a kidney. It is known that, when a kidney becomes dysfunctional due to renal failure or the like, activated fibroblasts produce a large amount of collagen, which causes tissue fibrosis. Accordingly, diagnosis of the presence and degree of fibrosis in the kidneys is extremely important. For the diagnosis of kidney fibrosis, the current mainstream test is a biopsy in which part of a kidney is cut out and examined; therefore, there is a great demand for non-invasive diagnosis. By applying the present embodiment to a kidney, fibrosis of the kidney can be measured non-invasively.

To calculate the area of a portion in which signals indicating a property are displayed, the area comparison unit 50 may perform weighting based on the strength of each signal. It is considered that the strength of a signal indicating an acoustically stimulated electromagnetic wave becomes higher as the degree of fibrosis of the biological tissue OR becomes greater. Accordingly, to calculate the area of a portion in which signals indicating a property are displayed, the area comparison unit 50 integrates a function for weighting each location of the biological tissue OR based on the strength of each signal. According to the present embodiment, the degree of fibrosis can be quantitatively evaluated more accurately.

Third Embodiment

Figure 6:
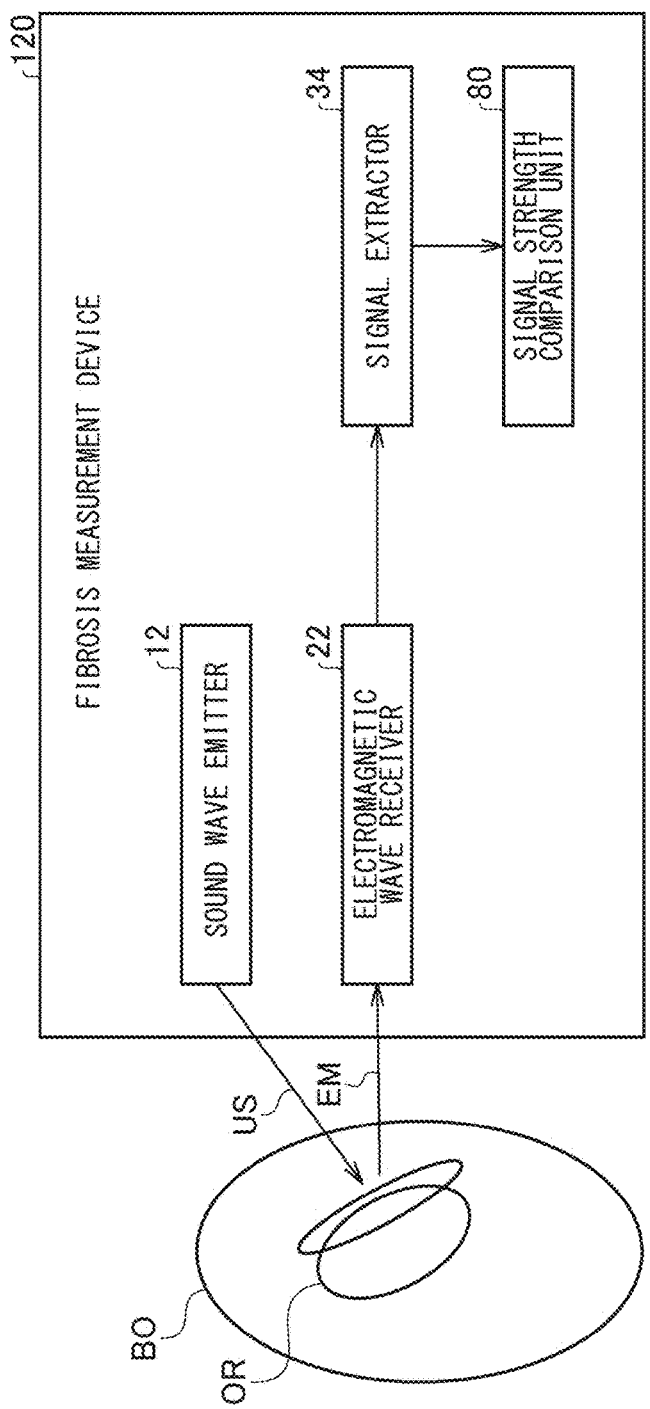
FIG. 6 is a functional block diagram of a fibrosis measurement device according to a third embodiment.

FIG. 6 shows functional blocks of a fibrosis measurement device 120 according to the third embodiment. The fibrosis measurement device 120 also measures fibrosis of a biological tissue non-invasively. The fibrosis measurement device 120 includes a sound wave emitter 12, an electromagnetic wave receiver 22, a signal extractor 34, and a signal strength comparison unit 80.

The sound wave emitter 12 emits sound waves US such that the sound waves US are concentrated on a biological tissue OR as a measurement object. Unlike the sound wave emitter 10 of the fibrosis measurement device 100, the sound wave emitter 12 need not perform scanning over the surface of the biological tissue OR to emit the sound waves US. The number of times the sound wave emitter 12 emits the sound waves US may be one or more times. The sound wave emitter 12 may emit the sound waves US over a wide area of the surface of the biological tissue OR. Particularly, the sound wave emitter 12 may emit the sound waves US over the entire surface of the biological tissue OR.

The electromagnetic wave receiver 22 receives electromagnetic waves EM generated in the biological tissue OR irradiated with the sound waves US. The electromagnetic wave receiver 22 may be disposed at a position and in a direction such as to efficiently receive the electromagnetic waves EM.

The signal extractor 34 extracts a signal indicating at least one property selected from a group including the electrical properties, magnetic properties, electromechanical properties, and magnetomechanical properties of the biological tissue OR, based on at least one selected from a group including the amplitude, phase, and frequency of an electromagnetic wave EM received by the electromagnetic wave receiver 22. Since the operations are the same as those performed by the signal extractor 30 of the fibrosis measurement device 100, the description thereof will be omitted.

The signal strength comparison unit 80 compares the strength of a signal extracted by the signal extractor 34 with a predetermined threshold. As described previously, it is considered that the strength of a signal indicating an acoustically stimulated electromagnetic wave becomes higher as the degree of fibrosis of the biological tissue OR becomes greater. Accordingly, a threshold related to signal strength may be determined in advance based on experiments and simulations, and the strength of a signal extracted by the signal extractor 34 may be compared with the threshold. When the strength of a signal extracted by the signal extractor 34 exceeds the threshold, for example, it may be determined that fibrosis has occurred. Alternatively, by defining, as an amount indicating the degree of fibrosis, the strength of a signal extracted by the signal extractor 34 that exceeds the threshold, fibrosis can be quantitatively evaluated.

While the sound wave emitter 10 of the fibrosis measurement device 100 performs scanning over the surface of the biological tissue OR to emit the sound waves US, the sound wave emitter 12 emits the sound waves US over a relatively wide area of the biological tissue OR. Accordingly, the sound wave emitter 12 can generate acoustically stimulated electromagnetic waves necessary for measurement by emitting sound waves fewer times (such as once) than the sound wave emitter 10. Therefore, according to the present embodiment, fibrosis of a biological tissue can be measured non-invasively in a short time.

The sound wave emitter 12 may have substantially the same curvature as a body surface covering a biological tissue OR as a measurement object. When the curvature of the sound wave emitter 12 differs from the curvature of the body surface, the arrival time of a sound wave at the body surface differs at each location of the body surface. Accordingly, the generation time of an acoustically stimulated electromagnetic wave in the biological tissue OR also differs at each location of the biological tissue, which makes accurate measurement difficult. Therefore, with the sound wave emitter 12 having substantially the same curvature as a body surface covering a biological tissue OR as a measurement object, fibrosis of the biological tissue can be made more accurate.

Fourth Embodiment

Figure 7:
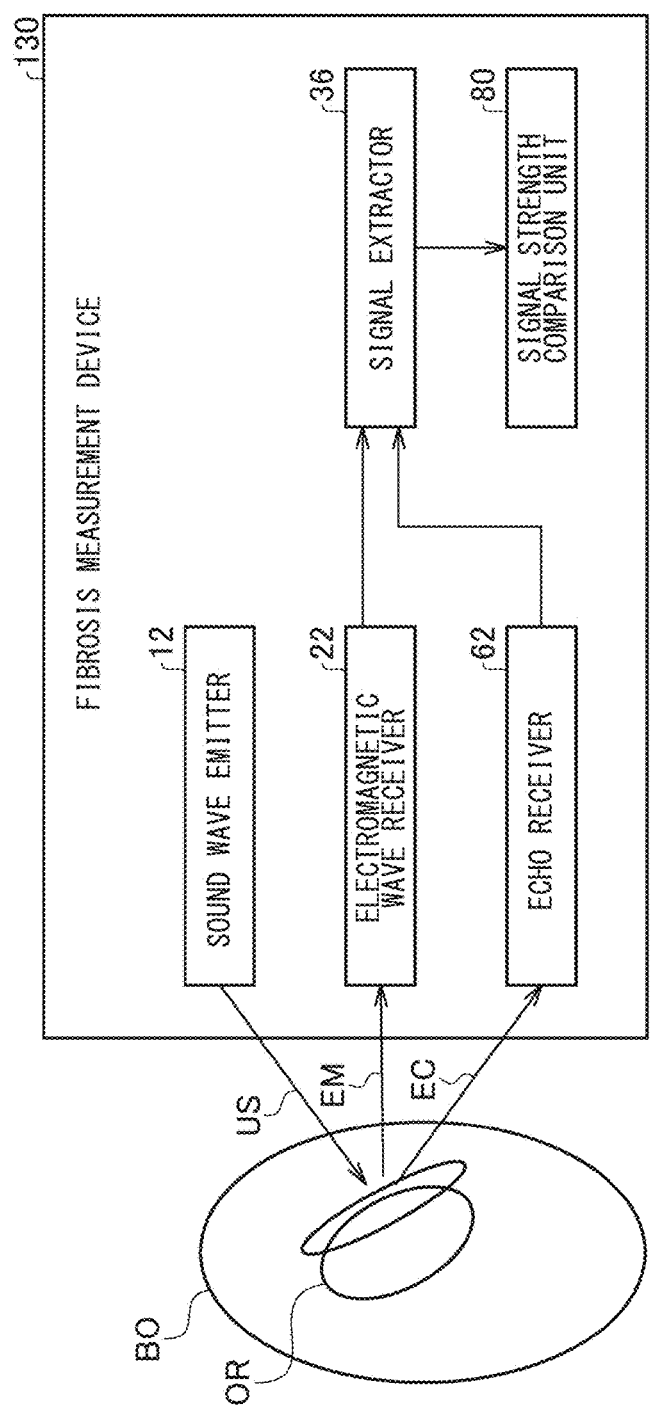
FIG. 7 is a functional block diagram of a fibrosis measurement device according to a fourth embodiment.

FIG. 7 shows a functional block diagram of a fibrosis measurement device 130 according to the fourth embodiment. The fibrosis measurement device 130 also measures fibrosis of a biological tissue non-invasively. The fibrosis measurement device 130 includes the sound wave emitter 12, the electromagnetic wave receiver 22, a signal extractor 36, an echo receiver 62, and the signal strength comparison unit 80.

Since the configurations of the sound wave emitter 12, the electromagnetic wave receiver 22, and the signal strength comparison unit 80 are identical with those of the fibrosis measurement device 120, the explanation thereof will be omitted. The echo receiver 62 receives echo signals EC from a biological tissue OR. The echo signals EC are sound echoes of the sound waves US emitted by the sound wave emitter 12 to the biological tissue OR. The echo receiver 62 may be disposed at a position and in a direction such as to efficiently receive the echo signals EC.

The signal extractor 36 extracts a signal indicating a property received in half the time from when the sound wave emitter 12 has emitted a sound wave US until the echo receiver 62 has received an echo signal EC, in which the signal is associated with the echo signal EC.

According to the present embodiment, since a targeted signal can be extracted from noise, fibrosis can be measured more accurately.

Fifth Embodiment

Figure 8:
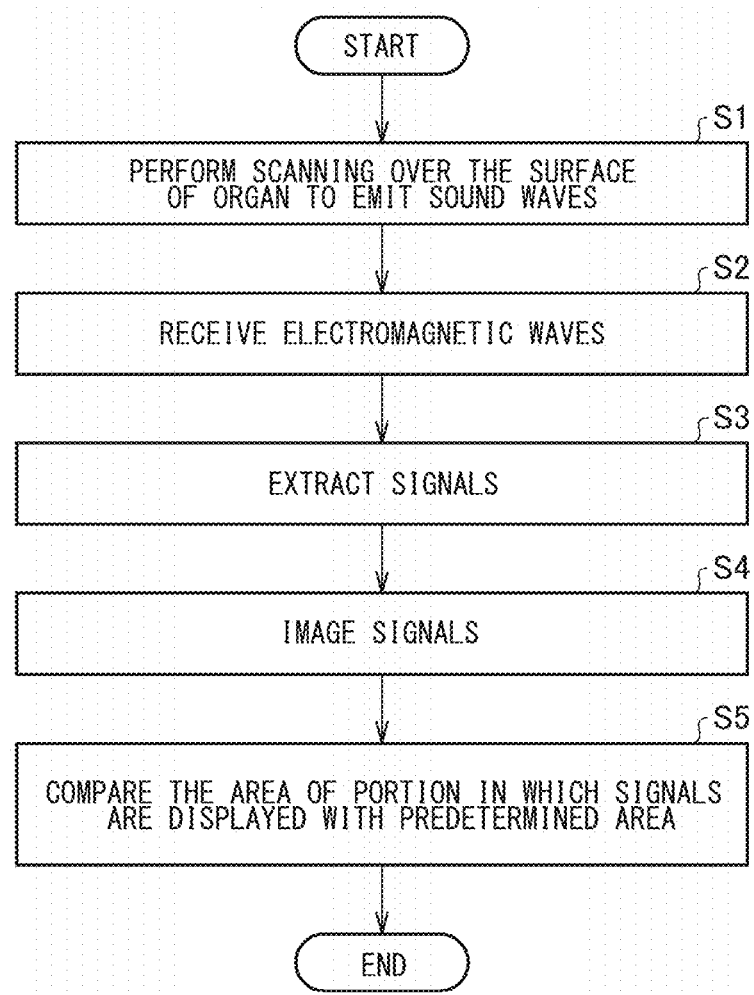
FIG. 8 is a flow diagram of a fibrosis measurement method according to a fifth embodiment.

FIG. 8 shows a flowchart of a fibrosis measurement method according to the fifth embodiment. The fibrosis measurement method includes a step S1 of performing scanning over the surface of a biological tissue to emit sound waves, a step S2 of receiving electromagnetic waves, a step S3 of extracting signals, a step S4 of imaging signals, and a step S5 of comparing the area of a portion in which signals are displayed with a predetermined area.

In the step S1 of the fibrosis measurement method, scanning is performed over the surface of a biological tissue as a measurement object and sound waves are emitted by means of a sound wave emitter, for example, such that the sound waves are concentrated on multiple locations of the biological tissue. In the step S2 of the fibrosis measurement method, electromagnetic waves generated at the respective locations of the biological tissue irradiated with the sound waves are received by means of an electromagnetic wave receiver, for example. In the step S3 of the fibrosis measurement method, signals are extracted that indicate at least one property selected from a group including the electrical properties, magnetic properties, electromechanical properties, and magnetomechanical properties of the biological tissue, based on at least one selected from a group including the amplitude, phase, and frequency of the received electromagnetic waves. In the step S4 of the fibrosis measurement method, the extracted signals are imaged as a two-dimensional image. In the step S5 of the fibrosis measurement method, the area of a portion of the two-dimensional image in which the signals indicating a property are displayed is compared with an area corresponding to a predetermined threshold of the strength of the signals.

According to the present embodiment, fibrosis of a biological tissue can be measured non-invasively.

Sixth Embodiment

Figure 9:
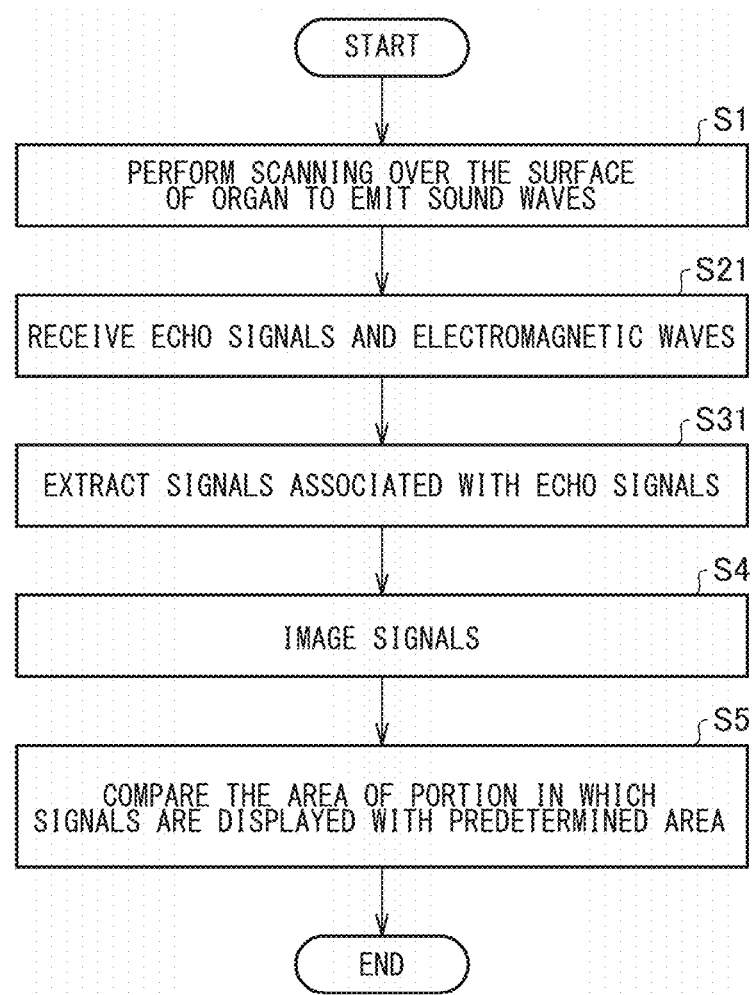
FIG. 9 is a flow diagram of a fibrosis measurement method according to a sixth embodiment.

FIG. 9 shows a flowchart of a fibrosis measurement method according to the sixth embodiment. The fibrosis measurement method includes a step S1 of performing scanning over the surface of a biological tissue to emit sound waves, a step S21 of receiving echo signals and electromagnetic waves, a step S31 of extracting signals associated with echo signals, a step S4 of imaging signals, and a step S5 of comparing the area of a portion in which signals are displayed with a predetermined area.

In the step S1 of the fibrosis measurement method, scanning is performed over the surface of a biological tissue as a measurement object and sound waves are emitted by means of a sound wave emitter, for example, such that the sound waves are concentrated on multiple locations of the biological tissue. In the step S21 of the fibrosis measurement method, electromagnetic waves generated at the respective locations of the biological tissue irradiated with the sound waves are received by means of an electromagnetic wave receiver, for example, and echo signals from the respective locations of the biological tissue irradiated with the sound waves are received by means of an echo receiver, for example. In the step S31 of the fibrosis measurement method, signals are extracted that indicate at least one property selected from a group including the electrical properties, magnetic properties, electromechanical properties, and magnetomechanical properties of the biological tissue, based on at least one selected from a group including the amplitude, phase, and frequency of the received electromagnetic waves, in which the signals are associated respectively with echo signals. In the step S4 of the fibrosis measurement method, the extracted signals are imaged as a two-dimensional image. In the step S5 of the fibrosis measurement method, the area of a portion of the two-dimensional image in which the signals indicating a property are displayed is compared with an area corresponding to a predetermined threshold of the strength of the signals.

According to the present embodiment, since a targeted signal can be extracted from noise, fibrosis can be measured more accurately.

Seventh Embodiment

Figure 10:
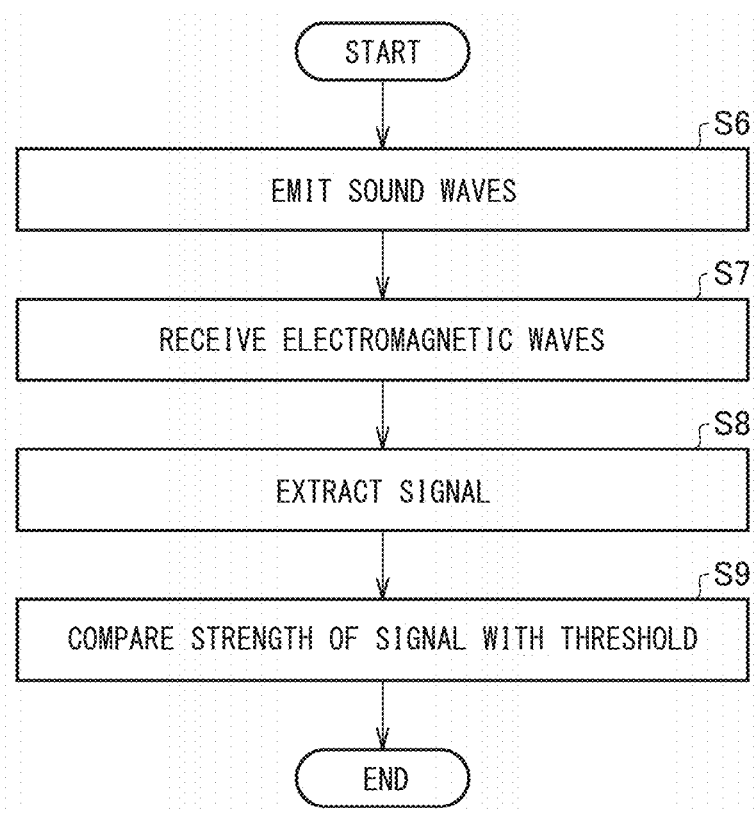
FIG. 10 is a flow diagram of a fibrosis measurement method according to a seventh embodiment.

FIG. 10 shows a flowchart of a fibrosis measurement method according to the seventh embodiment. The fibrosis measurement method includes a step S6 of emitting sound waves to a biological tissue, a step S7 of receiving electromagnetic waves, a step S8 of extracting a signal, and a step S9 of comparing the strength of a signal with a threshold.

In the step S6 of the fibrosis measurement method, sound waves are emitted by means of a sound wave emitter, for example, such that the sound waves are concentrated on a biological tissue as a measurement object. In the step S7 of the fibrosis measurement method, electromagnetic waves generated in the biological tissue irradiated with the sound waves are received by means of an electromagnetic wave receiver, for example. In the step S8 of the fibrosis measurement method, a signal is extracted that indicates at least one property selected from a group including the electrical properties, magnetic properties, electromechanical properties, and magnetomechanical properties of the biological tissue, based on at least one selected from a group including the amplitude, phase, and frequency of a received electromagnetic wave. In the step S9 of the fibrosis measurement method, the strength of the extracted signal is compared with a predetermined threshold.

According to the present embodiment, fibrosis of a biological tissue can be measured non-invasively in a short time.

Eighth Embodiment

Figure 11:
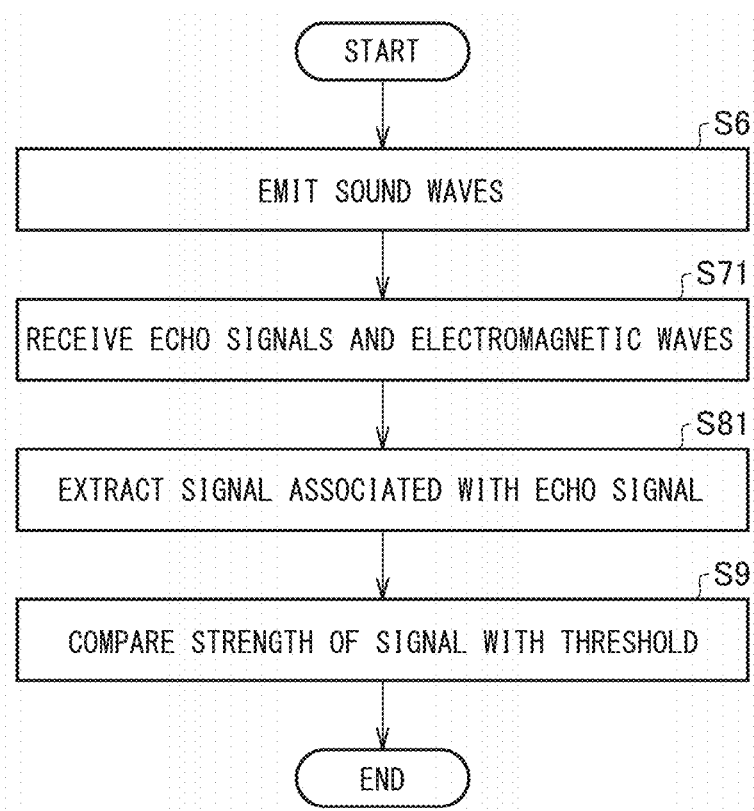
FIG. 11 is a flow diagram of a fibrosis measurement method according to an eighth embodiment.

FIG. 11 shows a flowchart of a fibrosis measurement method according to the eighth embodiment. The fibrosis measurement method includes a step S6 of emitting sound waves to a biological tissue, a step S71 of receiving echo signals and electromagnetic waves, a step S81 of extracting a signal associated with an echo signal, and a step S9 of comparing the strength of a signal with a threshold.

In the step S6 of the fibrosis measurement method, sound waves are emitted by means of a sound wave emitter, for example, such that the sound waves are concentrated on a biological tissue as a measurement object. In the step S71 of the fibrosis measurement method, electromagnetic waves generated in the biological tissue irradiated with the sound waves are received by means of an electromagnetic wave receiver, for example, and echo signals from the biological tissue irradiated with the sound waves are received by means of an echo receiver, for example. In the step S81 of the fibrosis measurement method, a signal indicating a property received in half the time until an echo signal is received is extracted, in which the signal is associated with the echo signal. In the step S9 of the fibrosis measurement method, the strength of the extracted signal is compared with a predetermined threshold.

According to the present embodiment, since a targeted signal can be extracted from noise, fibrosis can be measured more accurately.

Ninth Embodiment

Figure 12:
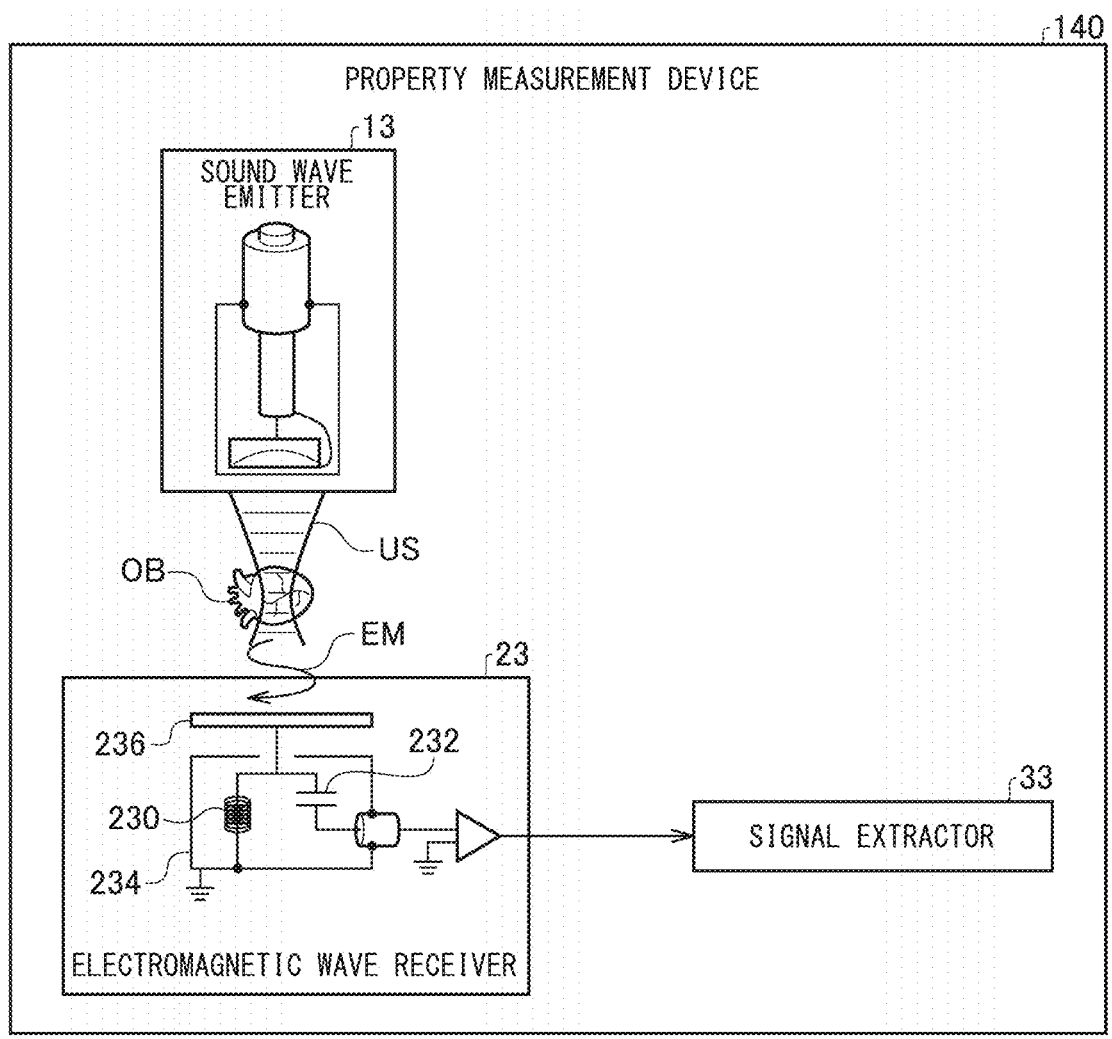
FIG. 12 is a functional block diagram of a property measurement device according to a ninth embodiment.

FIG. 12 shows functional blocks of a property measurement device 140 according to the ninth embodiment. The property measurement device 140 measures a property of a measurement object OB. The property measurement device 140 includes a sound wave emitter 13, an electromagnetic wave receiver 23, and a signal extractor 33. The electromagnetic wave receiver 23 includes a resonant circuit 234 provided with a coil 230 and a capacitor 232, and an electrostatic antenna 236 disposed between the coil and the capacitor.

The sound wave emitter 13 emits sound waves US such that the sound waves US are concentrated on the measurement object OB. In the present embodiment, the measurement object OB is not limited to a biological tissue. The electromagnetic wave receiver 23 receives electromagnetic waves EM generated in the measurement object OB irradiated with the sound waves US. The signal extractor extracts a signal indicating at least one property selected from a group including the electrical properties, magnetic properties, electromechanical properties, and magnetomechanical properties of the measurement object OB, based on at least one selected from a group including the amplitude, phase, and frequency of an electromagnetic wave EM received by the electromagnetic wave receiver.

Figure 13:
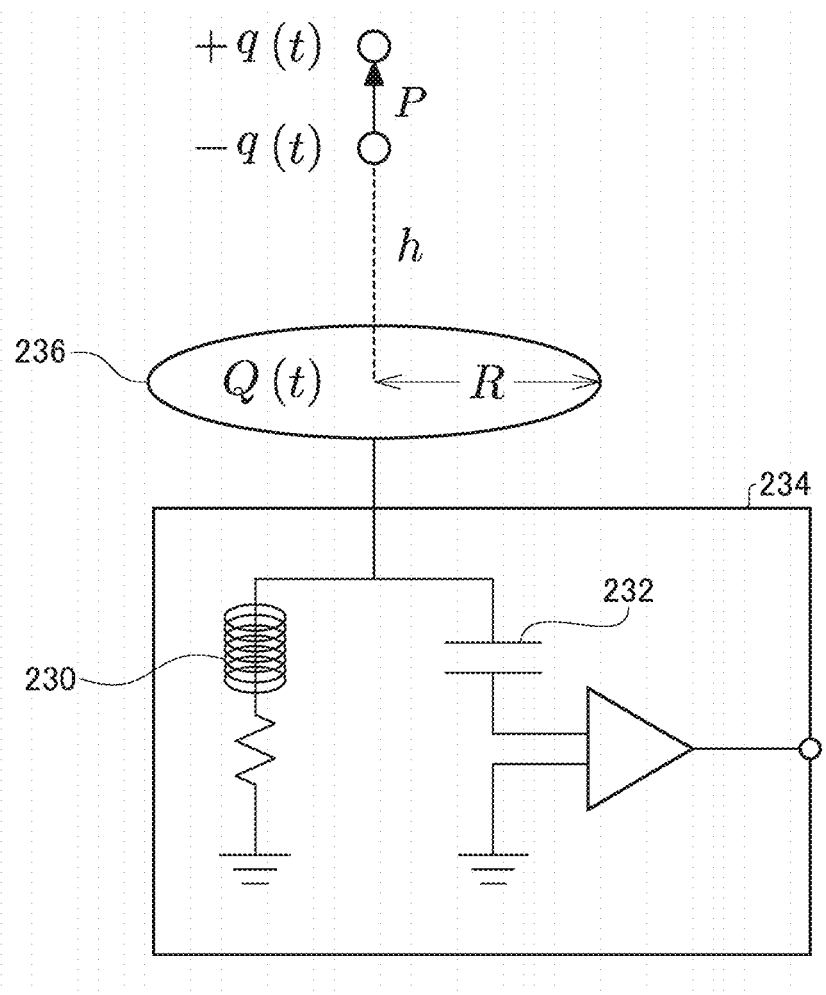
FIG. 13 is a schematic diagram of an electromagnetic wave receiver of the property measurement device shown in FIG. 12.

FIG. 13 schematically illustrates the electromagnetic wave receiver 23. The electrostatic antenna 236 is constituted by a discoid copper plate of diameter R. With the electromagnetic wave receiver 23 thus configured, the following dipole moment P(t) is generated at a point located vertically above the center of the electrostatic antenna 236 with a distance h therebetween.

$$P(t)=q(t)\cdot l=q_{dip}\cdot l\cdot \sin(\omega_0 \cdot t)$$

wherein a dipole charge q (t) that oscillates sinusoidally is defined as $$q(t)=q_{dip}\cdot \sin(\omega_0 t)$$

where $q_{dip}$ is the amplitude of a dipole charge, l is the distance between the dipole charges, and $\omega_0$ is the frequency of a sound wave.

On the surface of the electrostatic antenna 236, the following charge Q(t) is excited.

$$Q(t)=Q_0 \cdot \sin(\omega_0 \cdot t)$$

wherein $Q_0$ is the total charge on the electrostatic antenna 236. The value obtained by multiplying $Q_0$ by R is defined by the following equation (1).

[Math. 1]

$$Q_0 \times R = q_{dip} l [1+(h/R)^2]^{-3/2} \quad (1)$$

Also, the value obtained by multiplying signal voltage $V_{sig}$ by R is defined by the following equation (2).

[Math. 2]

$$V_{sig} \times R = V_0 R [1+(h/R)^2]^{-3/2} \quad (2)$$

wherein $V_0$ is the limit value of $V_{sig}$ when h/R is made close to zero, and $V_0$ is independent of R. The amplitude $q_{dip}$ of a dipole charge is defined by the following equation (3).

[Math. 3]

$$q_{dip} = \frac{2V_0 R}{Z_{in} \omega_0 l} \simeq \frac{2V_0 R}{\pi v_{ac} Z_{in}} \quad (3)$$

wherein $Z_{in}$ is preamplifier input impedance, and $v_{ac}$ is the speed of sound within the measurement object. It is assumed here that $Z_{in}=50\Omega$. Also, it is known that $v_{ac}$ in the aortic wall is 1590 m/s, and $v_{ac}$ in an Achilles tendon is 1700 m/s, for example.

Figure 14:
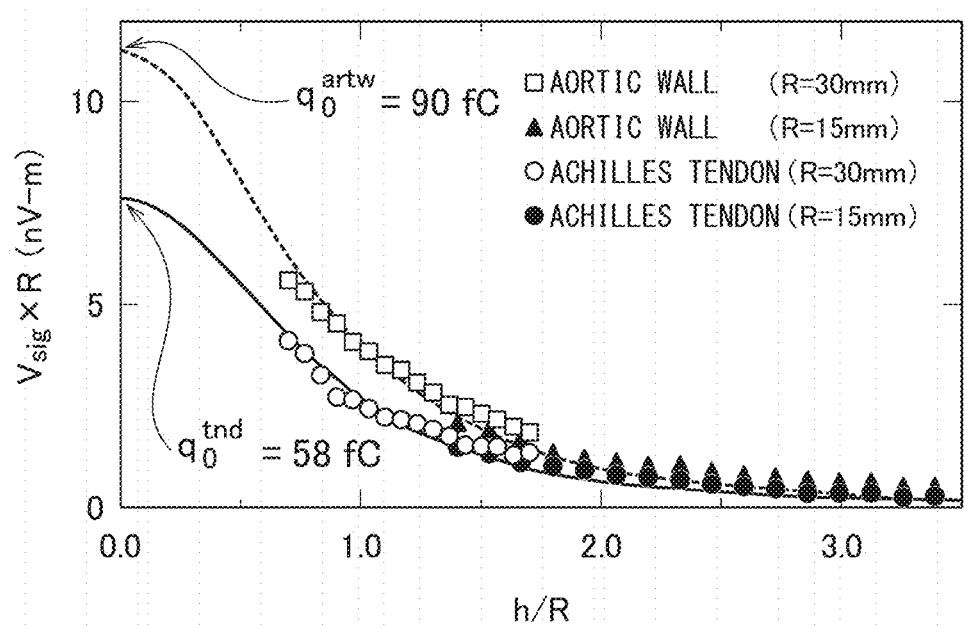
FIG. 14 is a graph that shows dependence of $V_{sig} \cdot R$ on h/R in the cases of the aortic wall and an Achilles tendon.

FIG. 14 shows dependence of $V_{sig} \cdot R$ on h/R in the cases of the aortic wall and an Achilles tendon. The signals were measured using two types of antennas, R=15 mm and R=30 mm. With the multiplication by R, the signal voltage $V_{sig}$ is favorably scaled. This indicates that the electric dipole has been acoustically excited. This experimental data is fitted into the equation (2). The values of $V_0 \cdot R$ for the aortic wall and Achilles tendon are 11.3 nV·m and 7.66 nV·m, respectively. Accordingly, the excited dipole charges for the aortic wall and Achilles tendon are 90 fC (femtocoulomb) and 58 fC, respectively. Thus, it is found that, with the electromagnetic wave receiver 23 configured as shown in FIG. 13, acoustically stimulated electromagnetic waves can be efficiently received.

Experimental Example

Using the fibrosis measurement device according to an embodiment, kidney fibrosis has been measured. FIGS. 15A-15D are pictures of a normal mouse kidney and a mouse kidney in which fibrosis has occurred due to renal failure. FIG. 15A shows a front side of the normal kidney, FIG. 15B shows a front side of the kidney with renal failure, FIG. 15C shows a back side of the normal kidney, and FIG. 15D shows a back side of the kidney with renal failure. FIGS. 16A-16D are pictures obtained by imaging signals by means of the fibrosis measurement device shown in FIG. 3, using the kidneys shown in FIGS. 15A-15D. Similarly, FIG. 16A shows the front side of the normal kidney, FIG. 16B shows the front side of the kidney with renal failure, FIG. 16C shows the back side of the normal kidney, and FIG. 16D shows the back side of the kidney with renal failure. As shown in FIGS. 16A-16D, on both the front and back sides, signals are imaged in larger area in the kidney with renal failure, compared to the normal kidney. More specifically, the ratio of the area of the portion in which the signals are displayed in the kidney with renal failure to that in the normal kidney is 10 on the front side and 1.7 on the back side.

Exemplary embodiments of the present invention have been described in detail. These embodiments are intended to be illustrative only, and it will be obvious to those skilled in the art that various modifications and changes could be developed within the scope of claims of the present invention and that such modifications and changes also fall within the scope of claims of the present invention. Therefore, the description in the present specification and the drawings should be regarded as exemplary rather than limitative.

Modifications

In the following, modifications will be described. In the drawings and description of the modifications, same reference characters denote same or corresponding constituting elements and members in the embodiments. Repetitive description already provided in the embodiments will be omitted as appropriate, and configurations different from those in the first embodiment will be intensively described.

In the embodiments, using the sound lens method, the sound wave emitter emits sound waves to a measurement object. However, the operation is not limited thereto, and the sound wave emitter may emit sound waves using the phased array method, for example. This modification allows greater flexibility in configuration.

In the embodiments, sound waves are emitted to a measurement object using a single sound wave emitter, and electromagnetic waves are received using a single electromagnetic wave receiver. However, the operation is not limited thereto, and multiple sound wave emitters or multiple electromagnetic wave receivers may be provided in the respective measurement regions of a measurement object. This can reduce the number of times of scanning and the measurement time.

Each of the abovementioned modifications provides functions and effects similar to those of the embodiments.

Optional combinations of the aforementioned embodiments and modifications may also be practiced as additional embodiments of the present invention. Such an additional embodiment made by combination has the effect of each of the combined embodiments and modifications.

INDUSTRIAL APPLICABILITY

The biological tissue fibrosis measurement according to the present invention can be performed safely and repetitively for examination and is applicable to medical treatment decisions in a variety of medical fields.

REFERENCE SIGNS LIST

1 focused sound beam
2 sound focused region
3 positively charged particle
4 negatively charged particle
10 sound wave emitter
13 sound wave emitter
12 sound wave emitter
20 electromagnetic wave receiver
22 electromagnetic wave receiver
23 electromagnetic wave receiver
30 signal extractor
32 signal extractor
34 signal extractor 36 signal extractor
40 imaging unit
50 area comparison unit
60 echo receiver
70 delay material
80 signal strength comparison unit
100 fibrosis measurement device
110 fibrosis measurement device
120 fibrosis measurement device
130 fibrosis measurement device
140 property measurement device
230 electrostatic antenna
232 capacitor
234 resonant circuit
BO body
OR biological tissue
US sound wave
EM electromagnetic wave
EC echo
OB measurement object
Sig1 signal
Sig2 signal
Sig3 signal
S1 step of performing scanning over the surface of biological tissue to emit sound waves
S2 step of receiving electromagnetic waves
S3 step of extracting signals
S4 step of imaging signals
S5 step of comparing the area of portion in which signals are displayed with predetermined area
S6 step of emitting sound waves
S7 step of receiving electromagnetic waves
S8 step of extracting a signal
S9 step of comparing strength of a signal with threshold
S21 step of receiving echo signals and electromagnetic waves
S31 step of extracting signals associated with echo signals
S71 step of receiving echo signals and electromagnetic waves
S81 step of extracting a signal associated with an echo signal

The invention claimed is:

1. A fibrosis measurement device that measures fibrosis of a biological tissue non-invasively, the fibrosis measurement device comprising:
a sound wave emitter that performs scanning over a surface of a biological tissue as a measurement object to emit sound waves such that the sound waves are concentrated on a plurality of locations of the biological tissue;
an electromagnetic wave receiver that receives an electromagnetic wave generated at each location of a biological tissue irradiated with the sound waves;
a signal extractor that extracts a signal indicating at least one property selected from a group including electrical properties, magnetic properties, electromechanical properties, and magnetomechanical properties of the biological tissue, based on at least one selected from a group including the amplitude, phase, and frequency of an electromagnetic wave received by the electromagnetic wave receiver;
an imaging unit that images, as a two-dimensional image, signals extracted by the signal extractor; and
an area comparison unit that compares the area of a portion of the two-dimensional image in which signals indicating the property are displayed, with an area corresponding to a predetermined threshold of the strength of the signals, to extract the signals actually caused by fibrosis of a biological tissue from noise,
wherein a plurality of piezoelectric elements are disposed on a concave curved surface, the concave curved surface has a shape so that the sound waves direct along directions perpendicular to the surface, and converge at a single focal point located at a target tissue.

2. The fibrosis measurement device according to claim 1, further comprising an echo receiver that receives an echo signal from each location of the biological tissue, wherein the signal extractor extracts a signal indicating the property received in half the time from when the sound wave emitter has emitted a sound wave until the echo receiver has received an echo signal, in which the signal is associated with the echo signal.

3. The fibrosis measurement device according to claim 1, further comprising a delay material provided between the sound wave emitter and the biological tissue.

4. The fibrosis measurement device according to claim 1, wherein the biological tissue includes at least one of an organ, a muscle, or skin.

5. The fibrosis measurement device according to claim 1, wherein the biological tissue is a kidney.

6. The fibrosis measurement device according to claim 1, wherein, when the area of a portion in which signals indicating the property are displayed is calculated, weighting is performed based on the strength of the signals.

7. A fibrosis measurement method for measuring fibrosis of a biological tissue non-invasively, the fibrosis measurement method comprising:
performing scanning over a surface of a biological tissue as a measurement object to emit sound waves such that the sound waves are concentrated on a plurality of locations of the biological tissue;
receiving an electromagnetic wave generated at each location of a biological tissue irradiated with the sound waves;
extracting a signal indicating at least one property selected from a group including electrical properties, magnetic properties, electromechanical properties, and magnetomechanical properties of the biological tissue, based on at least one selected from a group including the amplitude, phase, and frequency of a received electromagnetic wave;
imaging extracted signals as a two-dimensional image; and
comparing the area of a portion of the two-dimensional image in which signals indicating the property are displayed, with an area corresponding to a predetermined threshold of the strength of the signals, to extract the signals caused by fibrosis of a biological tissue from noise,
wherein a plurality of piezoelectric elements are disposed on a concave curved surface, the concave curved surface has a shape so that the sound waves direct along directions perpendicular to the surface, and converge at a single focal point located at a target tissue.

* * * * *